3,322,615
DISAGGREGATING AGENTS DERIVED FROM UNSATURATED HYDROCARBONS OF PETROLEUM FRACTIONS FOR MANUFACTURING PAPER AND PULP
Shoichi Kamiya, 257—56 Kamoecho, Hamamatsu-shi, Japan
No Drawing. Filed Oct. 31, 1963, Ser. No. 320,513
Claims priority, application Japan, Feb. 26, 1963, 38/8,485; Mar. 15, 1963, 38/12,424
3 Claims. (Cl. 162—72)

This invention relates to disaggregating agents for manufacturing paper and pulp. More particularly it relates to disaggregating agents containing, as principal constituents, substances obtained by treating unsaturated components of petroleum fractions with concentrated sulfuric acid.

When unsaturated hydrocarbons in petroleum fractions are treated with concentrated sulfuric acid, there are produced the sulfide sulfinic acid derivatives and sulfonic acid derivatives of these hydrocarbons. Depending on the geographical source, some crude petroleum already contains the sulfide. During usual refining of crude petroleum unsaturated hydrocarbons are transferred to the waste liquor after being treated by sulfuric acid. With the passage of time, they undergo decomposition, polymerization, resinification and finally carbonization. Accordingly it is difficult to separate these sulfinic acid derivatives and sulfonic acid derivatives. They are not only difficult to separate but also have the still further disadvantage, of unavoidably containing mixed impurities which, as a matter of course, lower the disaggregation efficiency.

An object of the present invention is to provide disaggregating agents containing the aforementioned effective constituents, the impurities therein having been reduced to as little as possible by a special separation and purification method. In another aspect an object of the present invention is to provide compositions of matter for disaggregating cellulose from wood, said compositions having no deleterious effect upon cellulose. Still another object of this invention is to provide compositions of matter which are useful in disaggregating cellulose from wood at a relatively low temperature and with a relatively high efficiency.

According to one embodiment of the present invention, petroleum fractions having a distillation range higher than middle oil are shaken with concentrated sulfuric acid to separate unsaturated hydrocarbons and the collected unsaturated portion is stored as washed liquid A.

Fractions corresponding to spindle oil are likewise shaken with sulfuric acid, collected and stored as washed liquid B.

Washed liquid A is diluted with addition of about five parts of water per part of washed liquid, and vigorously shaken with fine calcium carbonate powder to remove free sulfuric acid and precipitate gypsum. The dark, strong-sulfurous-acid-odorous liquid is neutralized with sodium hydroxide solution while cooling the liquid at a temperature near the freezing point, and taking care not to generate sulfurous anhydride by decomposition. After separating oily matter by a centrifugal separator, neutral liquid solution C is obtained. By concentrating solution C up to Bé. 20° and leaving the solution to cool, crystal A is separated.

As for washed liquid B, the same procedure as set forth above with regard to washed solution A is followed resulting in a solution D from which crystal B is separated.

The filtrate from which crystal A is separated, turns alkaline and the alkalinity is neutralized by dilute sulfuric acid. The neutralized solution is evaporated at reduced pressure to dryness, and powder E is produced.

A mixture of crystal A, crystal B and powder E constitutes the disaggregating agent of the present invention. Crystals A and B are slightly acidic, although substantially neutralized.

The mixture contains sodium sulfinate of unsaturated hydrocarbon and sodium sulfonate of unsaturated hydrocarbon. Powder D is mainly composed of sodium sulfite with which sulfide of unsaturated hydrocarbon and sodium sulfate are intermingled.

When the material having the above-mentioned compositions is used for the treatment of wood in the form of an aqueous solution, the sulfonic acid penetrates readily into the wood structure and breaks down the wooden parts surrounding the cellulose whereby the cellulose is liberated and, the disaggregation is thus performed. In this instance the sulfinic acid performs a bleaching action and the sulfide entering the wooden parts performs an additional bleaching function as well, thereby assisting in the liberation of cellulose. Accordingly, the three functions of diffusion, disaggregation and bleaching are performed. Because of these two accompanying functions, the disaggregation effect of the present agent is extremely enhanced when compared with simple disaggregation with use of conventional agents.

Since the conventional disaggregation agents are inorganic compounds, they are destroyed simultaneously with the disaggregation or cause such a side reaction as to combine with other substances.

In the case of organic disaggregating agents such as the present compositions no secondary action or further decomposition of the agent itself occurs after the disaggregation and removal of impurities are completed. This is due to the fact that the agents are high molecular compounds.

As the damage to cellulose due to side reactions is slight, it is only natural that the yield of cellulose is high.

In general, conventional disaggregation of wood, such as pine, in the form of wood scrap and wood chips does not afford such an excellent yield.

When conventional inorganic salts are used for liberating cellulose, they severely attack the wooden parts and even the cellulose cannot avoid suffering damage. When the wood is to be disaggregated, a so-called digestion operation is employed so as to penetrate liquor into the wooden parts thereby fixing the cellulose. When the composition of the present invention is used in this operation for the purpose of liberating cellulose from the wooden parts, there is no deleterious effect upon the cellulose. Moreover with only a simple ordinary-pressure, open digestor and at a relatively low temperature, satisfactory results can be achieved.

According to another embodiment of the present invention relating to digestive liquor, the following procedure is most preferred. A petroleum fraction higher than middle oil is shaken with concentrated sulfuric acid to effect reaction therewith. The resulting dark brown, viscous liquid is dissolved in water. The temperature is prevented from rising over 5° C., for example, by floating a lump of ice on the surface, while agitating, and caustic soda solution is added thereto for neutralization. After separating the brown oil liberated from the neutral solution by a centrifugal separator, sodium hydroxide, ammonium sulfate and sodium sulfite are added in amounts of 10–15 percent, 2 percent and 1 percent respectively each by weight of the amount of sodium hydroxide consumed in neutralization.

Further sodium hydroxide is added to make the pH slightly greater than 8.

Then the solution is subjected to drying at reduced pressure whereby a powdered product is obtained. This is the agent of the present invention.

Because of the permeability of the sodium sulfonate of the hydrocarbon, penetration of the present liquor is enhanced. Sulfonic acid and the sulfide of the hydrocarbon make the wooden parts swell and disaggregate. Ammonium sulfate makes the wooden parts softer by which digestion is promoted. Sodium sulfide has beside the functions of digestion and disaggregation, a function of decomposing coloring materials and bringing them into solution. Sodium sulfite takes part in detaching wooden parts from the cellulose.

Thus by the actions of diffusion, bleaching and disaggregation performed by sulfur compounds of the hydrocarbons and the assisting action of inorganic salts the disaggregation by use of this agent is satisfactory in that the resulting cellulose receives no deleterious effect. Accordingly the high yield of cellulose achieved by use of this agent is reasonable.

The invention will be illustrated in greater detail by the description in connection with the following specific examples:

*Example 1*

50 liters of a petroleum fraction having distillation range higher than middle oil (200° C. to 250° C.) are shaken with 200 grams of concentrated sulfuric acid to separate unsaturated hydrocarbons and collected as washed solution A. 1 liter of cold water is added thereto and fine calcium carbonate powder which is slightly in excess of the amount needed to precipitate free sulfuric acid as gypsum, is added. The resulting dark, strong-sulfurous-acid-odorous liquid is neutralized with 49 percent by weight of sodium hydroxide while cooling the liquid at about 3° C. After separating oily matter by a centrifugal separator, concentrating the solution to 20° Bé. and allowing to cool, 15 grams of crystal (A) are obtained. Similarly 12 grams of crystal (B) are obtained from 50 liters of spindle-oil-corresponding fraction by the same treatment as in the case of crystal (A). The filtrate from which crystal A is separated is neutralized and then evaporated at a reduced pressure to dryness, by which 42 grams of powder is obtained. This powder is mixed with crystals A and B to make a superior disaggregating agent.

By use of the disaggregating agent, excellent pulp having superior properties is obtained in better yield than with the conventional method as shown in the following table.

PULP YIELD (IN PERCENT)

| | Rice Straw | Banana | Jute |
|---|---|---|---|
| Conventional agents: | | | |
| Soda method | 44 | 64 | 64 |
| Calcium method | 52 | 68 | 60 |
| Sulfide method | 44 | 63 | 60 |
| The chemicals of the present invention | 56 | 72 | 72 |

*Example 2*

50 liters of petroleum fraction having higher distillation range than middle oil (200° C.–250° C.) are shaken with 400 grams of concentrated sulfuric acid and the separated unsaturated hydrocarbon layer is collected as the washed liquid. 2 liters of cold water are added to the above washed solution. 100 grams of fine calcium carbonate powder which is slightly in excess of the amount needed to precipitate free sulfuric acid as gypsum is added thereto and 162 cc. of 49 percent by weight sodium hydroxide is added while cooling the liquid at 3° C. After concentrating the solution to Bé. 20° and separating 21.5 cc. of oily matter, 90 grams of sodium sulfide, 15 grams of ammonium sulfate and 5 grams of sodium hydroxide are added to the clear solution which is subjected to drying at a reduced pressure, whereby 216 grams of the mixture of crystals and powder is obtained.

This mixture is dissolved in water for digesting waste paper or wood chips to obtain chemical pulp. The conditions of the digesting are much milder than those in conventional digesting as shown in the following table.

| | Digesting of waste paper | | Digesting of hard paper | |
|---|---|---|---|---|
| | Temp., ° C. | Time, hrs. | Temp., ° C. | Time, hrs. |
| Conventional digesting | 60 | 2 | 80 | 3 |
| Digesting by use of the chemical of the present invention | 40 | 1 | 60 | 2 |

What I claim is:

1. A disaggregation agent for pulp and paper manufacture which comprises a mixture of A crystal, B crystal and C powder in which A crystal is made by shaking petroleum fractions higher than middle oil with concentrated sulfuric acid, diluting the resultant washed liquid with five times as much water, removing free sulfuric acid as gypsum by calcium carbonate, neutralizing by sodium hydroxide while cooling, separating oily matter, concentrating to Bé. 20°, allowing to cool, and drying at reduced pressure, B crystal is made by shaking petroleum fractions corresponding to spindle oil and treating by the same procedure as in case of crystal A and C powder is made by neutralizing the mother liquor from which A crystal is separated, and drying at reduced pressure.

2. A disaggregation agent according to claim 1 in which the temperature of cooling is lower than 5° C. when the neutralization by sodium hydroxide is performed.

3. A wood-digesting agent comprising compositions of matter obtained by reacting petroleum fractions higher than middle oil with concentrated sulfuric acid to form a mixture of sulfide, sulfinic acid, and sulfonic acid of hydrocarbons, neutralizing the resultant solution with sodium hydroxide solution, separating oily matter from neutral solution, adding sodium sulfide in an amount from 10 to 15 percent by weight of the sodium hydroxide used in neutralization, ammonium sulfate in an amount 2 percent by weight of the sodium hydroxide used in neutralization and sodium sulfite in an amount 1 percent by weight of the sodium hydroxide used in neutralization, further controlling pH at higher than 8 by addition of sodium hydroxide solution and drying at reduced pressure.

References Cited

UNITED STATES PATENTS

| 806,954 | 12/1905 | Colahan | 162—72 |
| 897,522 | 9/1908 | Colahan | 162—76 |
| 1,843,851 | 2/1932 | Thuau | 162—76 X |

DONALL H. SYLVESTER, *Primary Examiner.*

H. R. CAINE, *Assistant Examiner.*